US006923266B1

(12) United States Patent
McLeod

(10) Patent No.: US 6,923,266 B1
(45) Date of Patent: Aug. 2, 2005

(54) CANTILEVERED OUTBOARD TINE DEVICE FOR SOIL AERATION

(75) Inventor: Robert Archie McLeod, Woodstock (CA)

(73) Assignee: Holland Equipment Limited, Norwich (CA)

( * ) Notice: Subject to any disclaimer, the term of this patent is extended or adjusted under 35 U.S.C. 154(b) by 2 days.

(21) Appl. No.: 10/839,347

(22) Filed: May 6, 2004

(51) Int. Cl.[7] .............................................. A01B 45/00

(52) U.S. Cl. ........................ 172/21; 172/579; 172/599; 172/694

(58) Field of Search .......................... 172/21, 518, 540, 172/548, 568, 574, 576, 579, 582, 596, 599, 172/601, 613, 657, 658, 681, 694, 697, 734, 172/741, 753, 762

(56) References Cited

U.S. PATENT DOCUMENTS 4,383,580 A * 5/1983 Huxford ....................... 172/21
4,840,232 A * 6/1989 Mayer .......................... 172/21

* cited by examiner

Primary Examiner—Christopher J. Novosad
(74) Attorney, Agent, or Firm—Gowling Lafleur Henderson LLP; D. Doak Horne

(57) ABSTRACT

An outboard tine device for soil-aerating equipment is disclosed comprising a hub having an aperture, a rotatable shaft within the aperture and mounted on the soil-aerating equipment, an outboard tine assembly comprising a plurality of outwardly protruding tines, and a securing member adjacent an outboard side of the outboard tine assembly removably securing the outboard tine assembly to the hub, wherein the securing member and hub are respectively positioned on opposing sides of and adjacent to the outboard tine assembly, wherein the outboard tine assembly, hub and securing member are positioned outboard of the mounting assembly resulting in the outboard tine assembly being cantilevered from the shaft. A dual outboard tine device is also disclosed. The outboard tine device is directed to uniform aerating and enabling easier replacement of damaged tines.

51 Claims, 8 Drawing Sheets

CANTILEVERED OUTBOARD TINE DEVICE FOR SOIL AERATION

FIELD OF THE INVENTION

The present invention relates to agricultural equipment, and more particularly to agricultural equipment for use with soil aeration.

BACKGROUND

It is known that soil needs to be periodically aerated or de-compacted to encourage growth of a crop by facilitating the access of air, moisture, and nutrients to its roots and by providing space for the roots to grow. With relatively large areas, it is usual to effect aeration by means of tractor-towed aerating equipment. The purposes for which a given area is maintained can vary, requiring different kinds of aeration. It may be necessary to regularly aerate sub-soil without significantly disturbing the surface or, alternatively, it may be necessary to aerate an area while also turning over the surface soil. Also, aeration may be necessary with highly compacted soil, for example, in pasture land compacted by grazing animals; in such cases it is also usually necessary not to significantly disturb the surface.

Different types of aerating equipment have been employed in the past to effect aeration in different kinds of situations as mentioned above. For example, U.S. Pat. No. 4,383,580 to Huxford describes an aerating implement which is especially useful for aerating soil in pastures where it is necessary not to unduly disturb the surface. To achieve this, the aerating implement has a plurality of shafts rotatably mounted on a frame with their axes at an angle in the range of 70°–90° to the direction of travel, a plurality of substantially planar ground cutting and penetrating members mounted on the shaft with the plane of each cutting member at an angle of 70–90 degrees to the axis of its shaft towards its outer end. Since issuance of the Huxford patent, operation of the particular implement has been altered by re-orienting the cutting members such that the longitudinal centre line of each cutting member does not pass through the axis of rotation of the shaft (as taught in the Huxford patent), but is rather shifted rearwardly relative to the direction of movement of the shaft so that the longitudinal centre line of each cutting member is rearwardly spaced from the axis of rotation of the shaft, and also by twisting each cutting member by a small angle about its longitudinal centre line.

However, as suggested above, such an implement is not suitable for situations where it is desired to aerate the sub-soil and also turn over the surface. Another type of aerating implement thus has to be used in such situations, requiring the availability of two different types of aerating implement, which may be cost-prohibitive given the particular operator.

Prior attempts to address this problem have sought to provide aerating implements which are adjustable to enable both aeration without substantially disturbing the surface and aeration with turnover of the surface.

For example, U.S. Pat. No. 4,840,232 to Mayer discloses soil-aerating equipment which comprises a frame moveable in an intended direction of travel, at least a pair of gangs freely rotatably mounted on the frame for rotation about the longitudinal axis, such gangs extending in rearwardly-inclined opposite directions on opposite sides of a centre line of said frame extending in the direction of travel, means for adjusting the rearward inclination of the gangs to desired angles in the range of from about 90–120 degrees to the direction of travel, each gang carrying a series of soil-engaging substantially planar tines extending therefrom in vertical planes and positioned to sequentially engage and penetrate the soil with consequent rotation of the gangs when the frame is moved in the direction of travel, each tine having a central longitudinal axis which extends behind the gang's rotational axis at a distance therefrom in the range from about 0.25 to about 1.75 inches, and each tine being twisted about the tine central longitudinal axis at an angle to a vertical plane parallel to the direction of travel in the range of from about 1–30 degrees.

It has been found that soil aeration without significantly disturbing the surface can be effected by positioning the gangs at an angle to the direction of travel in the lower part of the angular range taught by the Mayer patent, and that soil aeration with surface turnover can be effected by positioning the gangs at an angle to the direction of travel in the upper part of the specified angular range. An operator can thus utilize the same piece of equipment for both purposes, thereby saving not only the cost of having to provide another item of equipment but also saving time because aeration equipment in accordance with the invention can readily be adjusted for use in one situation or the other. Thus, an operator does not have to return from a work area to another place to change equipment.

However, with some aeration equipment comprising at least a pair of gangs each journalled for rotation at their respective ends and supported by bearings at the respective ends where the gangs are typically positioned along a common axis in side-by-side arrangement, a problem arises in that a gap is effected between tine assemblies on adjacent gangs, due to space required to journal the respective ends and provide securement of the aeration device to the equipment frame. Such a gap is often greater than the individual spacing between tines on the gangs, particularly where the tines on each gang are spaced relatively close to each other. The undesirable result is a wide strip of soil intermediate the pair of gangs where no aeration is effected.

In order to overcome this problem, the Mayer device incorporated a cantilevered tine assembly at each gang end, outboard of the bearings on which the gangs were journalled. The tines were therefore able to be positioned intermediate the journalled ends of the gangs and thus could aerate the soil in the area intermediate adjacent gangs.

However, the cantilevered tine assembly of Mayer was of integral construction, which proved disadvantageous in some situations. Should one of the tines in the integral tine assembly become damaged or irreparably worn, replacement of the whole integral assembly was necessary. This proved to be both expensive and time-consuming, as tines would frequently become broken, particular in rocky areas.

SUMMARY OF THE INVENTION

There exists a need to provide a cantilevered tine device for aeration equipment of the type disclosed in Mayer, but which also eliminates the requirement to replace the entire tine assembly in the event of breakage of or damage to one of the plurality of tines forming a part of the cantilevered tine gang assembly.

According to a first aspect of the present invention there is provided an outboard tine device for soil-aerating equipment comprising:
    a hub having an aperture extending therethrough;
    a rotatable shaft member within the aperture;
    means to communicate rotational motion of the shaft member to the hub;

means for removably securing the hub to the shaft member;

a mounting assembly in communication with the shaft member for mounting the shaft member on the soil-aerating equipment;

an outboard tine assembly comprising a plurality of outwardly protruding tine members, the outboard tine assembly adapted to rotate with the shaft member, such that at least a portion of each tine member sequentially penetrates soil when the outboard tine assembly is moved over the soil; and a securing member adjacent an outboard side of the outboard tine assembly removably securing the outboard tine assembly to the hub, wherein the securing member and hub are respectively positioned on opposing sides of and adjacent to the outboard tine assembly, whereby rotational motion of the hub is communicated to the outboard tine assembly and the securing member;

wherein the outboard tine assembly, hub and securing member are positioned outboard of the mounting assembly resulting in the outboard tine assembly being cantilevered from the shaft member.

According to a second aspect of the present invention there is provided a dual outboard tine device for soil-aerating equipment comprising:

inner and outer hubs, the inner hub having an aperture extending therethrough;

a rotatable shaft member within the aperture;

means to communicate rotational motion of the shaft member to the inner hub;

means for removably securing the inner hub to the shaft member;

a mounting assembly in communication with the shaft member for mounting the shaft member on the soil-aerating equipment;

inner and outer outboard tine assemblies comprising a plurality of outwardly protruding tine members, the outboard tine assemblies adapted to rotate with the shaft member, such that at least a portion of each tine member sequentially penetrates soil when the outboard tine assemblies are moved over the soil, wherein the inner and outer hubs are respectively positioned on opposing sides of and adjacent to the inner outboard tine assembly;

means for communicating rotational motion of the inner hub to the inner outboard tine assembly and the outer hub; and a securing member adjacent an outboard side of the outer outboard tine assembly removably securing the outer outboard tine assembly to the outer hub, wherein the securing member and outer hub are respectively positioned on opposing sides of and adjacent to the outer outboard tine assembly, whereby rotational motion of the outer hub is communicated to the outer outboard tine assembly and the securing member;

wherein the inner and outer hubs, the inner and outer outboard tine assemblies, and the securing member are positioned outboard of the mounting assembly resulting in the outboard tine assemblies being cantilevered from the shaft member.

According to a third aspect of the present invention there is provided soil-aerating equipment comprising:

a frame movable in an intended direction of travel; and an outboard tine device comprising:

a hub having an aperture extending therethrough;

a rotatable shaft member within the aperture;

means to communicate rotational motion of the shaft member to the hub;

means for removably securing the hub to the shaft member;

a mounting assembly in communication with the shaft member mounting the shaft member on the frame;

an outboard tine assembly comprising a plurality of outwardly protruding tine members, the outboard tine assembly adapted to rotate with the shaft member, such that at least a portion of each tine member sequentially penetrates soil when the outboard tine assembly is moved over the soil; and a securing member adjacent an outboard side of the outboard tine assembly removably securing the outboard tine assembly to the hub, wherein the securing member and hub are respectively positioned on opposing sides of and adjacent to the outboard tine assembly, whereby rotational motion of the hub is communicated to the outboard tine assembly and the securing member;

wherein the outboard tine assembly, hub and securing member are positioned outboard of the mounting assembly resulting in the outboard tine assembly being cantilevered from the shaft member.

According to a fourth aspect of the present invention there is provided soil-aerating equipment comprising:

a frame movable in an intended direction of travel; and a dual outboard tine device comprising:

inner and outer hubs, the inner hub having an aperture extending therethrough;

a rotatable shaft member within the aperture;

means to communicate rotational motion of the shaft member to the inner hub;

means for removably securing the inner hub to the shaft member;

a mounting assembly in communication with the shaft member mounting the shaft member on the frame;

inner and outer outboard tine assemblies comprising a plurality of outwardly protruding tine members, the outboard tine assemblies adapted to rotate with the shaft member, such that at least a portion of each tine member sequentially penetrates soil when the outboard tine assemblies are moved over the soil, wherein the inner and outer hubs are respectively positioned on opposing sides of and adjacent to the inner outboard tine assembly;

means for communicating rotational motion of the inner hub to the inner outboard tine assembly and the outer hub; and a securing member adjacent an outboard side of the outer outboard tine assembly removably securing the outer outboard tine assembly to the outer hub, wherein the securing member and outer hub are respectively positioned on opposing sides of and adjacent to the outer outboard tine assembly, whereby rotational motion of the outer hub is communicated to the outer outboard tine assembly and the securing member;

wherein the inner and outer hubs, the inner and outer outboard tine assemblies, and the securing member are positioned outboard of the mounting assembly resulting in the outboard tine assemblies being cantilevered from the shaft member.

According to a fifth aspect of the present invention there is provided an outboard tine device for soil-aerating equipment comprising:

at least one paired outboard tine assembly and corresponding hub, the at least one corresponding hub having an aperture extending therethrough, the at least one outboard tine assembly adjacent to and outboard of the corresponding hub;

a rotatable shaft member within the aperture;

means to communicate rotational motion of the shaft member to the at least one corresponding hub;

means for removably securing the at least one corresponding hub to the shaft member;

a mounting assembly in communication with the shaft member for mounting the shaft member on the soil-aerating equipment;

the at least one outboard tine assembly comprising at least one outwardly protruding tine member, the at least one outboard tine assembly adapted to rotate with the shaft member, such that at least a portion of the at least one tine member penetrates soil when the at least one outboard tine assembly is moved over the soil; and a securing member adjacent an outboard side of the at least one paired outboard tine assembly and corresponding hub removably securing together an outermost paired outboard tine assembly and corresponding hub, whereby rotational motion of the corresponding hub is communicated to the outboard tine assembly and the securing member;

wherein the securing member and the at least one paired outboard tine assembly and corresponding hub are positioned outboard of the mounting assembly resulting in the at least one outboard tine assembly being cantilevered from the shaft member.

According to a sixth aspect of the present invention there is provided an outboard tine device for soil-aerating equipment comprising:

a hub having an aperture extending therethrough, the hub comprising a first flange;

a rotatable shaft within the aperture;

a spline on the shaft and the aperture keyed to accept the spline, to communicate rotational motion of the shaft to the hub;

a fastening member removably securing the hub to the shaft;

a bearing assembly on the shaft for mounting the shaft on the soil-aerating equipment;

an outboard tine assembly comprising a plurality of outwardly protruding tine members, the outboard tine assembly adapted to rotate with the shaft, such that at least a portion of each tine member sequentially penetrates soil when the outboard tine assembly is moved over the soil; and a second flange adjacent an outboard side of the outboard tine assembly, the second flange removably mechanically fastened to the outboard tine assembly and the first flange, wherein the first and second flanges are respectively positioned on opposing sides of and adjacent to the outboard tine assembly, whereby rotational motion of the first flange is communicated to the outboard tine assembly and the second flange;

wherein the outboard tine assembly, first flange and second flange are positioned outboard of the bearing assembly resulting in the outboard tine assembly being cantilevered from the shaft.

According to a seventh aspect of the present invention there is provided a dual outboard tine device for soil-aerating equipment comprising:

inner and outer hubs, the inner hub having an aperture extending therethrough, the inner hub comprising a first flange, the outer hub comprising a corresponding second flange and an inner flange;

a rotatable shaft within the aperture;

a spline on the shaft and the aperture keyed to accept the spline, to communicate rotational motion of the shaft to the inner hub;

a fastening member removably securing the inner hub to the shaft;

a bearing assembly on the shaft for mounting the shaft on the soil-aerating equipment;

inner and outer outboard tine assemblies comprising a plurality of outwardly protruding tine members, the outboard tine assemblies adapted to rotate with the shaft, such that at least a portion of each tine member sequentially penetrates soil when the outboard tine assemblies are moved over the soil, wherein the inner and outer hubs are respectively positioned on opposing sides of and adjacent to the inner outboard tine assembly;

at least one fastening member securing the first flange to the inner outboard tine assembly and the second flange, thereby communicating rotational motion of the inner hub to the inner outboard tine assembly and the outer hub; and an outer flange adjacent an outboard side of the outer outboard tine assembly removably securing the outer outboard tine assembly to the inner flange, wherein the outer and inner flanges are respectively positioned on opposing sides of and adjacent to the outer outboard tine assembly, whereby rotational motion of the outer hub is communicated to the outer outboard tine assembly and the outer flange;

wherein the inner and outer hubs, the inner and outer outboard tine assemblies, and the outer flange are positioned outboard of the bearing assembly resulting in the outboard tine assemblies being cantilevered from the shaft.

In some preferred embodiments of the present invention, the means to communicate rotational motion of the shaft member to the hub (or inner hub, according to the second and fourth aspects) comprises the shaft member having a polygonal (and most preferably hexagonal) cross section and the aperture of the hub (or inner hub) being keyed to the shaft member. In other preferred embodiments, the means to communicate rotational motion of the shaft member to the hub (or inner hub) comprises the shaft member communicating with the hub (or inner hub) by means of at least one spline.

The means for removably securing the hub (or inner hub) to the shaft member preferably comprises at least one fastening member, and most preferably a bolt member and a hole in an outboard end of the shaft member threaded so as to accept the bolt member. The mounting assembly is preferably a bearing assembly on the shaft member, and the securing member, outboard tine assembly (or outer outboard tine assembly, according to the second and fourth aspects) and hub (or outer hub, according to the second and fourth aspects) are preferably mechanically fastened.

According to the first and third aspects of the present invention, the securing member preferably comprises a flange removably mechanically fastened to the outboard tine assembly and the hub by at least one fastening member, the hub preferably comprising a second flange whereby the flange is removably mechanically fastened to the outboard tine assembly and the second flange by at least one fastening member; the at least one fastening member preferably comprises a plurality of bolt members passing through the flange, outboard tine assembly and second flange, thereby removably securing the outboard tine assembly to the flange and second flange.

According to the second and fourth aspects of the present invention, the means for communicating rotational motion of the inner hub to the inner outboard tine assembly and the outer hub preferably comprises removable mechanical fastening of the inner hub to the inner outboard tine assembly and the outer hub. The inner hub and outer hub preferably comprise first and second flanges respectively, the first flange, inner outboard tine assembly and second flange being removably mechanically fastened by at least one fastening member, and most preferably by a plurality of bolt members passing through the first and second flanges and inner outboard tine assembly, thereby removably securing the inner outboard tine assembly to the first and second flanges. The securing member and outer hub preferably comprise outer and inner flanges respectively, the inner and outer flanges and outer outboard tine assembly being removably mechanically fastened by at least one fastening member, and most preferably by a plurality of bolt members passing through the inner and outer flanges and outer outboard tine assembly, thereby removably securing the outer outboard tine assembly to the inner and outer flanges.

A detailed description of exemplary embodiments of the present invention is given in the following. It is to be understood, however, that the invention is not to be construed as limited to those embodiments.

BRIEF DESCRIPTION OF THE DRAWINGS

In the accompanying drawings, which illustrate exemplary embodiments of the present invention and, together with the description, serve to explain the principles of the invention.

DETAILED DESCRIPTION OF EXEMPLARY EMBODIMENTS

Referring now in detail to the accompanying drawings, exemplary embodiments of the aeration device of the present invention are provided, as well as examples of prior art devices.

Figure 1A:
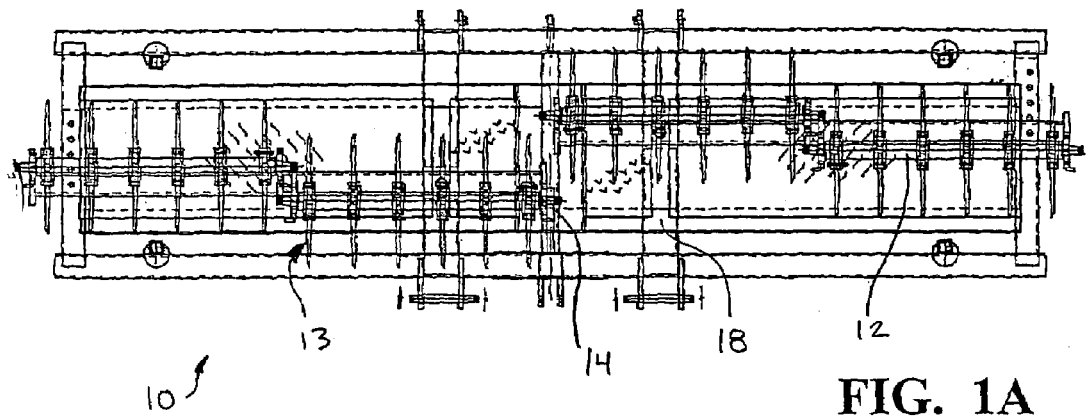
FIG. 1A is a top plan view, partially transparent, of a prior art aeration device having offset tine gangs, without any cantilevered tine assemblies.
Figure 1B:
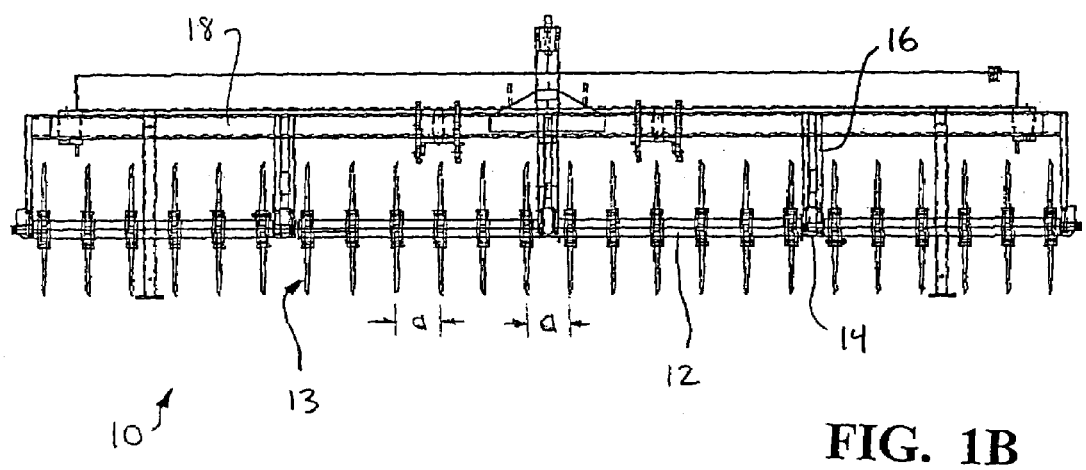
FIG. 1B is a front elevation view of the prior art device shown in FIG. 1A, having offset tine gangs and without any cantilevered tine assemblies.

FIGS. 1A and 1B provide top plan and front elevation views, respectively, of a prior art soil-aerating device 10. The soil-aerating device 10 comprises a frame 18 from which support members 16 depend, the support members 16 having bearings 14 at their lower ends for communication with four tine gangs or rollers 12. The tine gangs 12 are provided with a plurality of tine assemblies 13. Due to the bearings 14 and support members 16 at opposite ends of the tine gangs 12 taking up space outboard of the tine assemblies 13 and causing a gap between the aeration paths of adjacent tine gangs 12, the prior art soil-aerating device 10 employed longitudinal alternate staggering of the tine gangs 12 in order to ensure evenly-spaced rows of aerated soil. Such staggering of adjacent tine gangs 12 permitted the bearings 14 and support members 16 to be placed in front of (or behind, as the case may be) a portion of an adjacent tine gang 12, thereby ensuring that the tine assemblies 13 are evenly spaced a distance "a", such that there is no aeration path gap when such a device 10 is towed behind other powered machinery such as a tractor.

However, although the staggered tine gang configuration addresses the gap problem, space restrictions may make uniform or symmetrical staggering difficult or impossible to achieve. Also, using the device 10 can result in a phenomenon known in the art as "dog-tracking". The result of dog-tracking is that one side of the device cultivates more aggressively than the other, leaving visible stripes in the land. Dog-tracking usually occurs at larger swing angles, and the tractor steering can create a yaw moment in keeping the mounted device going straight where the tractor does not have a three-point hitch. Where the tractor does not have a three-point hitch, this frequently resulting in patches or areas of soil being poorly aerated, thereby defeating the original purpose of the soil-aerating device 10.

In order to overcome problems of dog-tracking, prior art aeration devices would typically configure tine gangs laterally substantially along a common line, disposed substantially perpendicularly to the direction of travel of the device.

Figure 2A:
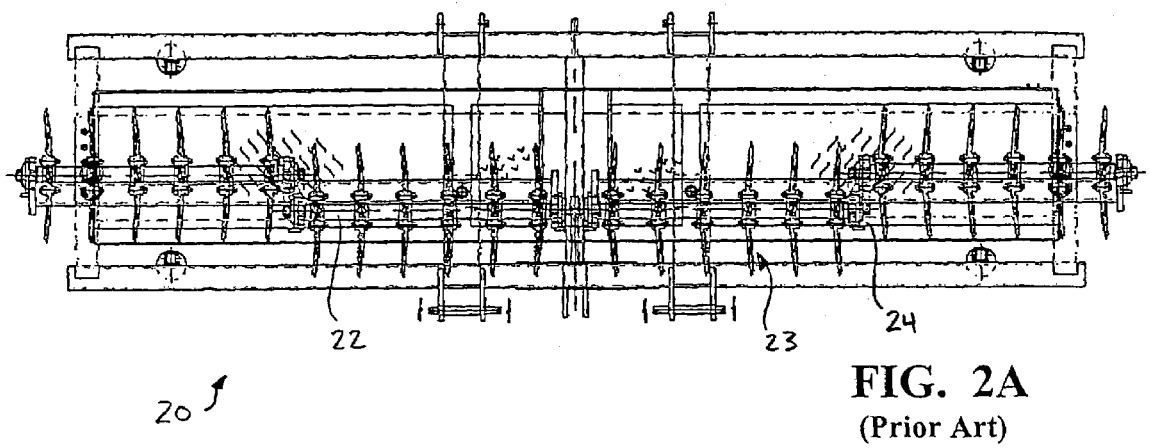
FIG. 2A is a top plan view, partially transparent, of a second prior art aeration device, having intermediate tine gangs which are not offset but rather situated immediately adjacent each other.
Figure 2B:
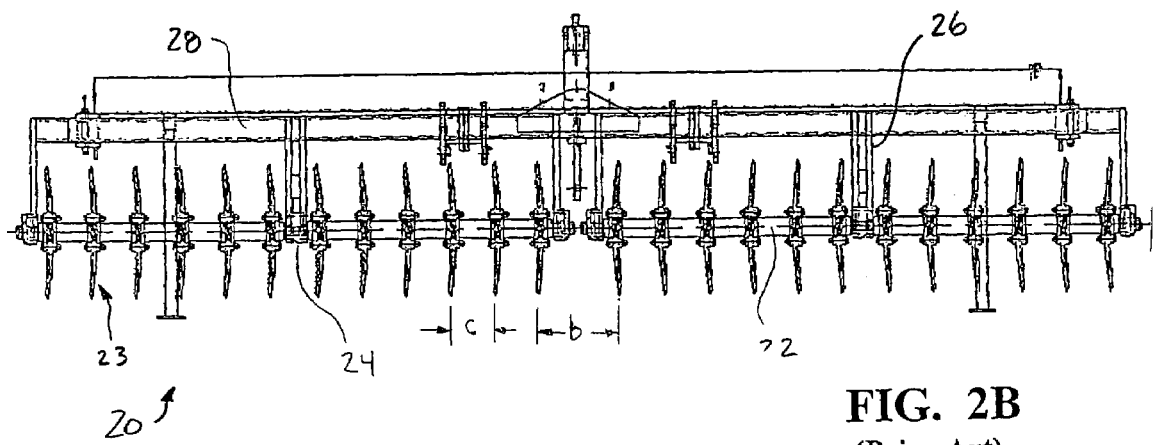
FIG. 2B is a front elevation view of the prior art device shown in FIG. 2A, illustrating the problematic increased separation distance intermediate the two centre shafts, where no cantilevered tine assemblies are used.

FIGS. 2A and 2B show top plan and front elevation views of such a prior art soil-aerating device 20, having tine gangs 22 arranged substantially symmetrically. The soil-aerating device 20 comprises a frame 28 from which support members 26 depend, the support members 26 having bearings 24 at their lower ends for communication with four tine gangs 22, the tine gangs 22 being provided with a plurality of tine assemblies 23.

Disadvantageously, however, as may be seen from the front elevation view in FIG. 2B, while the dog tracking problem may have been addressed, a gap is created in the aeration path. Due to lateral space taken up by the bearings 24 and support members 26 which support the tine gangs 22 at opposite ends thereof, such a configuration would typically result in distance "b" between mutually adjacent tine gangs 22 being greater than distance "c" separating each of the tine assemblies 23 on a tine gang 22. Such greater spacing "b" accordingly resulted in a wide strip of non-aerated soil (or at least wider strip than is the case with the spacing "c").

Figure 3A:
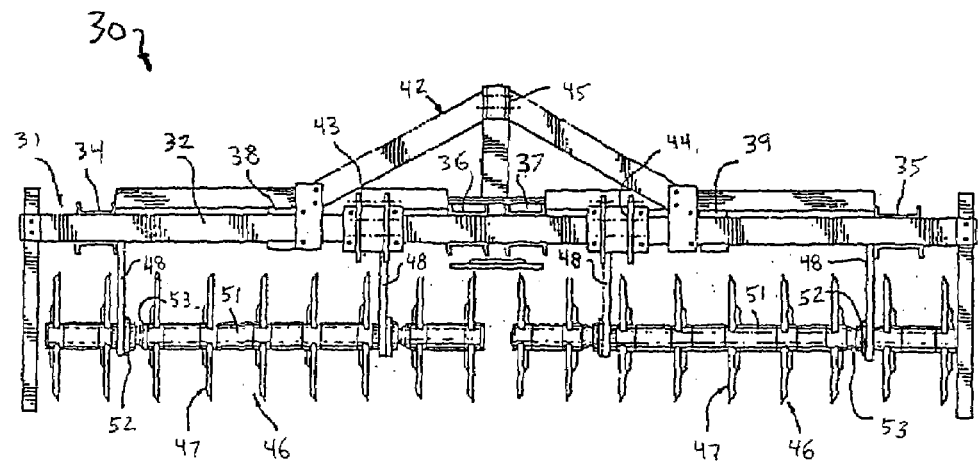
FIG. 3A is a top plan view of a prior art soil-aeration device as described in the Mayer patent, a dual tine assembly of integral construction being cantilevered.
Figure 3B:
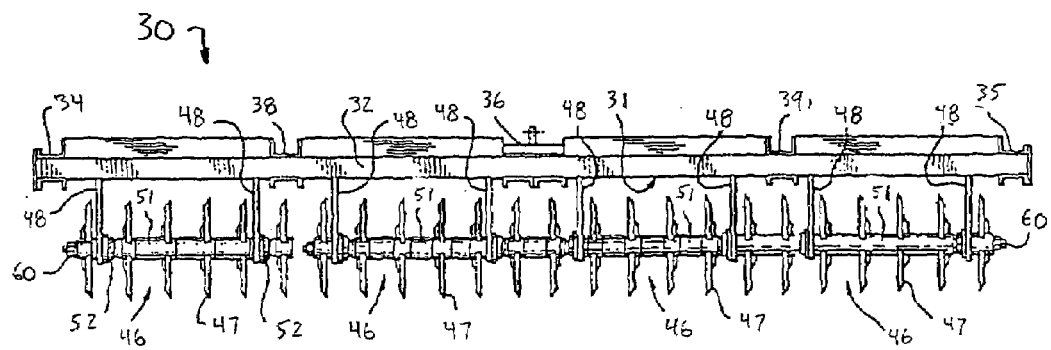
FIG. 3B is a front elevation view of another embodiment of the prior art soil-aeration device as described in the Mayer patent, a single tine assembly of integral construction being cantilevered.

In order to be able to produce uniformly-spaced strips of aerated soil without experiencing the problem of dog-tracking, the Mayer patent taught a novel device design, as can be seen in FIGS. 3A to 6. FIGS. 3A and 3B illustrate two embodiments of a soil-aerating device 30 having a frame 31 comprising a front member 32, side members 34, 35, centre members 36, 37, and intermediate members 38, 39. The frame 31 is provided with a three-point hitch assembly 42 comprising lower couplings 43, 44 and an upper coupling 45. Tine gangs 46 are provided containing tine assembles 47. Each tine gang 46 is suspended from the frame 31 by pairs of legs 48. The lower end of legs 48 are connected to each tine gang 46 at a leg bearing 52 inboard of either the first (in FIG. 3B) or second (in FIG. 3A) tine assembly 47 from each end. Each tine assembly 47 is spaced from an adjacent tine assembly 47 by an annular spacer 51 and from a leg bearing 52 by a shorter spacer 53. All tine gangs 46 according to Mayer consist of individual sets of tine assemblies 47 integral with a rotating hub 54.

Figure 4A:
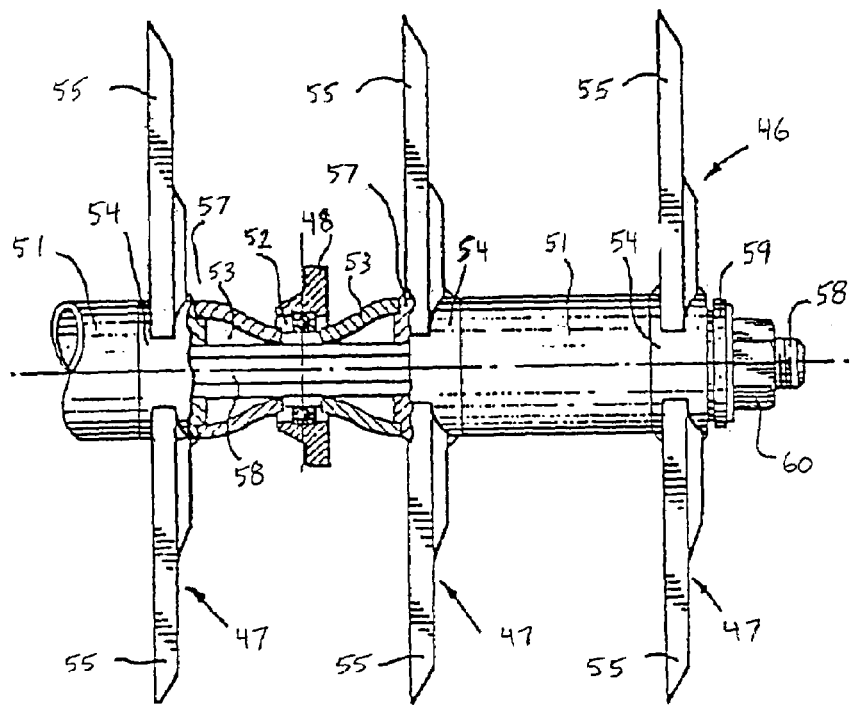
FIG. 4A is a detailed view, partially in section, of the prior art dual cantilevered tine assembly embodiment shown in FIG. 3A above.
Figure 4B:
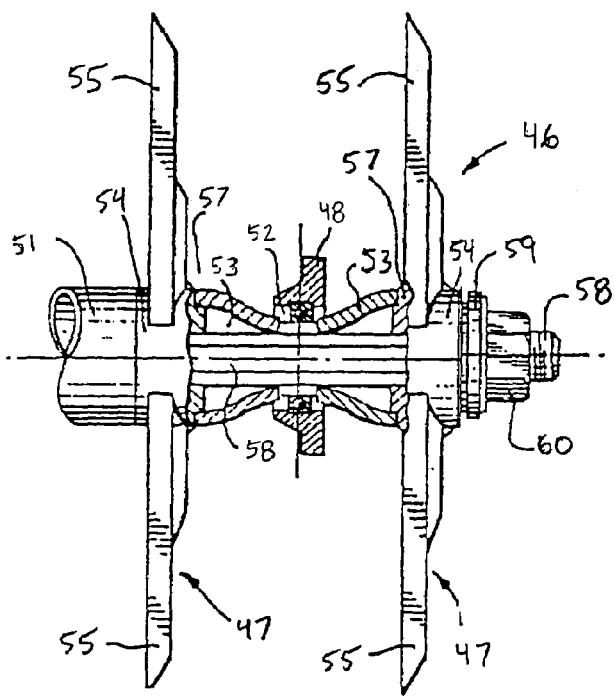
FIG. 4B is a detailed view, partially in section, of the prior art single cantilevered tine assembly embodiment shown in FIG. 3B above.

FIG. 4A is a detailed view, partially in section, of the prior art dual cantilevered tine arrangement shown in FIG. 3A and described above. The cantilevered dual tine arrangement is mounted on the shaft 58 by means of a nut 60 threaded onto the shaft 58 with a washer 59. This prior art dual tine arrangement comprises a pair of tine assemblies 47 each comprising a plurality of tines 55 formed from a casting, cast integral with a metallic hub 54 from which three tines 55 extend radially outwardly in an equally-angularly spaced relationship, i.e. at an angle of 120 degrees between adjacent tines 55. The hub 54 has a central aperture 56 of hexagonal shape (not shown) and an annular projection 57 on each side. Each tine gang 46 comprises a shaft 58 with a hexagonal section on which the tine assemblies 47 are mounted, with the tine assemblies 47 being keyed to the shaft 58 for rotation therewith. The intermediate tine assembles 47 are spaced from each other by annular spacers 51 which fit at opposite ends over the annular projections 57 of the adjacent tine assembles 47. A bearing 52 carried by the lower end of the leg 48 is mounted on the shaft 58. An adjacent tine assembly 47 is spaced from the bearing 52 by shorter-shaped spacers 53 which engage the annular projection 57 of the hub 54 at one end and the bearing 52 at the other end. These components are retained in an assembly on the shaft 58 by washers 59 and nuts 60 on threaded ends of the shaft 58. FIG. 4B is a detailed view, partially in section, of the prior art single cantilevered tine assembly embodiment illustrated in FIG. 3B and discussed above, with a basic structure similar to that discussed above regarding FIG. 4A.

Figure 5:
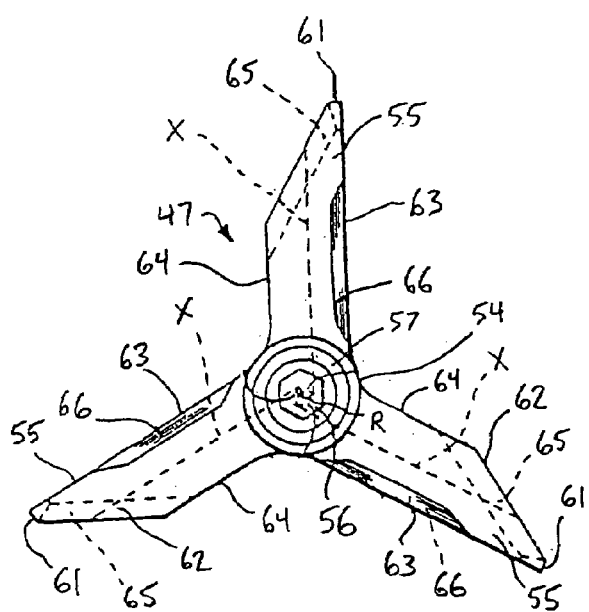
FIG. 5 is a detailed side elevation view of an integral tine assembly of the prior art with integral hub and tines.
Figure 6:
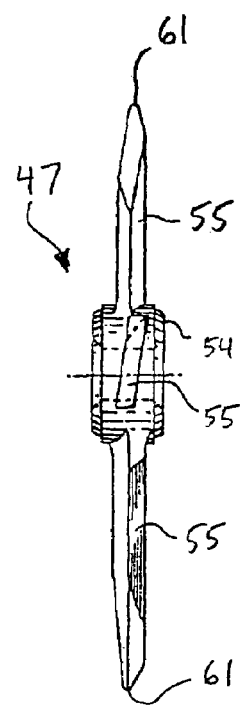
FIG. 6 is a front elevation view of the integral tine assembly shown in FIG. 5.

Referring now to FIGS. 5 and 6, there is provided a detailed view of an integral tine assembly 47. FIG. 5 illustrates a detailed side elevation view of an integral tine assembly 47, while FIG. 6 illustrates a front elevation view. Each tine assembly 47 is a metal casting with a hub 54 from which three tines 55 extend in equally-angularly spaced relationship, i.e. at an angle of 120 degrees between adjacent tines 55. The hub 54 has a central aperture 56 and an annular projection 57 on each side. Each tine 55 is in the form of a planar blade extending in a vertical plane from the hub 52 and having a pointed end 61. A first ground engaging edge 62 extends, when the tine 55 is in a vertical downwardly extending position, in an upwardly and rearwardly inclined direction. A second edge 63 extends from the pointed end 61 to the hub 54 in a vertical direction, and a third edge 64 extends from the end of the first edge 62. The first edge 62 is bevelled at 65 over the whole of its length, and the second edge 63 is bevelled at 66 over a major part of its length extending from the hub 54, the bevelling of the first edge 62 being on the opposite side of tine 55 to the bevelling of second edge 63.

Each tine 55 has a central longitudinal axis X midway between and parallel to the edges 63, 64 which extend behind the rotational axis of the shaft 58 (indicated at R in FIG. 5), being spaced therefrom by a distance which in this embodiment is 0.625 inches. As shown especially in FIG. 6, each tine 55 is twisted about its central axis X by 8 degrees from the vertical plane parallel to the direction of travel, the axis X being perpendicular to the longitudinal axis of the shaft 58.

However, as stated above, the Mayer device was of integral construction, which proved disadvantageous in some situations. Should one of the tines in the integral tine assembly become damaged or irreparably worn, replacement of the whole integral assembly was necessary, an expensive and time-consuming situation, hence the need for the present invention. Two embodiments of the present invention are illustrated by means of FIGS. 7A, 7B, 8, 9, 10, and 11.

Figure 7A:
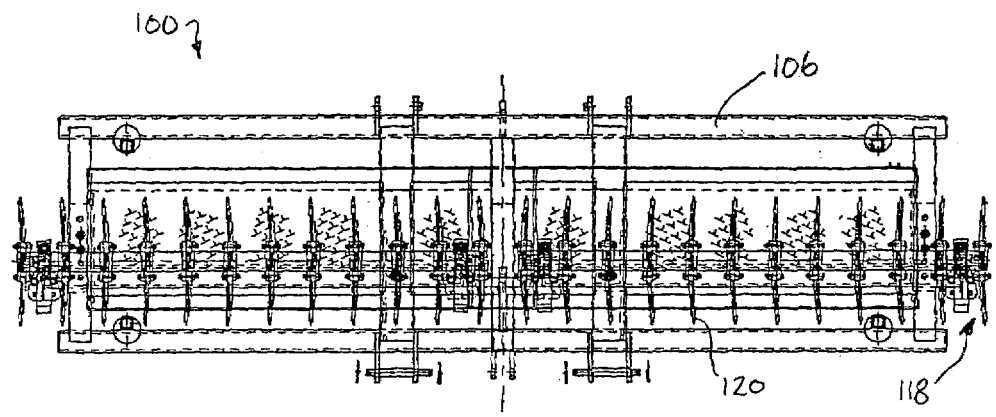
FIG. 7A is a top plan view, partially transparent, of a soil-aerating device according to the present invention, having non-offset shafts, and having a pair of cantilevered single tine assemblies on mutually adjacent shafts.
Figure 7B:
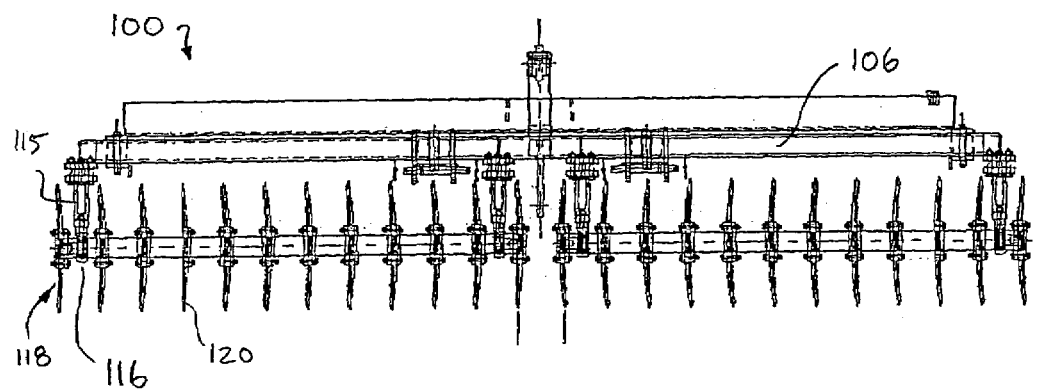
FIG. 7B is a front elevation view, partially transparent, of the soil-aerating device according to the present invention shown in FIG. 7A above.

According to an aspect of the present invention as embodied in FIGS. 7A and 7B, a soil-aerating device 100 is illustrated comprising a frame 106 for towing behind a vehicle (not shown), the frame 106 having legs 115 depending therefrom, the lower ends of the legs 115 being provided with bearing assemblies 116. The bearing assemblies 116 communicate with a plurality of tine gangs or devices, two in this embodiment, each tine gang comprising outboard tine assemblies 118 having a plurality of tines 120, four in this embodiment, the tines 120 similar in structure to those disclosed in Mayer.

Figure 8:
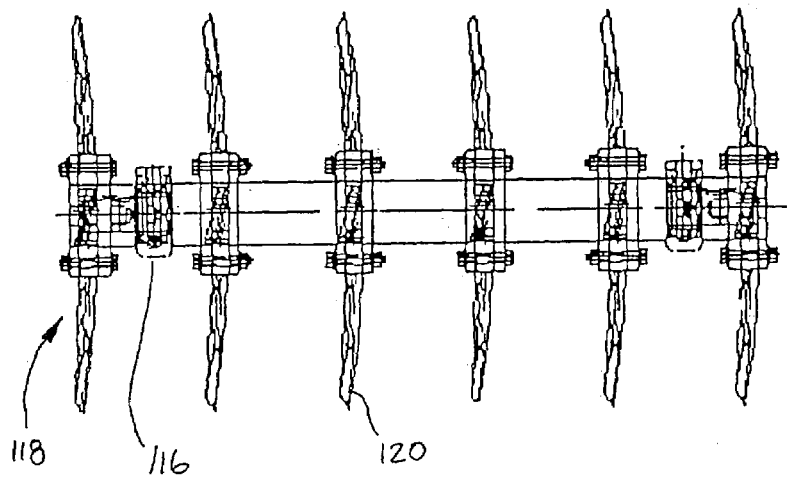
FIG. 8 is a detail view of the outboard tine device shown in FIGS. 7A and 7B above, namely a single outboard tine device having cantilevered single tine assemblies.
Figure 9:
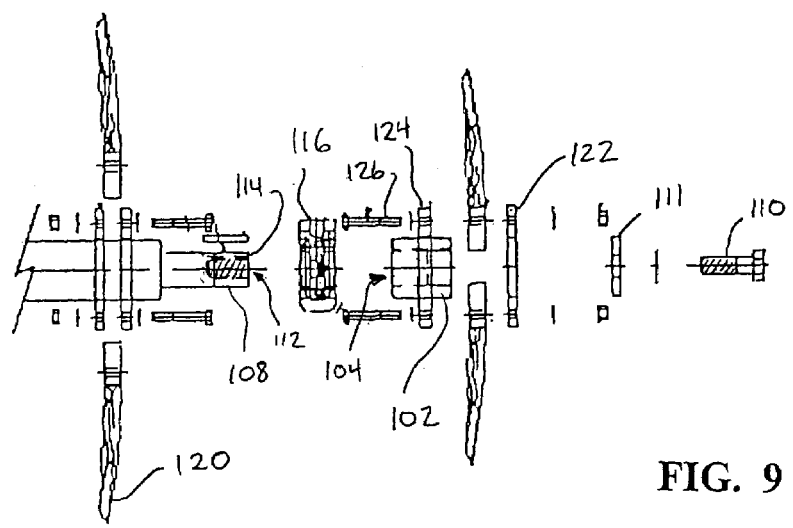
FIG. 9 is a detail exploded view of the cantilevered single tine assembly according to the present invention as shown in FIG. 8 above.

Referring now particularly to FIGS. 8 and 9, each of the tine gangs or devices comprise a single outboard tine assembly 118 positioned outboard of the bearing assembly 116, the single outboard tine assembly 118 comprising tines 120. As can best be seen in FIG. 9, the gang comprises a hub 102 having an aperture 104 extending therethrough, a rotatable shaft 108 housed within the aperture 104, and the hub 102 secured to the outboard end 114 of the shaft 108 by means of a bolt 110 engaged within a threaded hole 112 in the outboard end 114 of the shaft 108, a disc 111 situated between the hub 102 and head of the bolt 110. To communicate rotational motion of the shaft 108 to the hub 102, the shaft 108 has a hexagonal cross section, and the aperture 104 is keyed to communicate with that cross section. Although a hexagonal arrangement is set out, it will be clear to anyone skilled in the art that other means of communicating the rotation are possible, such as using other polygonal arrangements or a splined engagement. The bearing assembly 116 communicates with the shaft 108 immediately inboard of the hub 102. The gang further comprises a flange 122 at the extreme outboard end of the gang, the flange 122 mechanically fastened to the tines 120 of the outboard tine assembly 118 and a second flange 124 on the hub 102 by means of a plurality of bolts 126 extending therethrough. The outboard tine assembly 118, hub 102, and flange 122 are therefore positioned outboard of the bearing assembly 116 resulting in the outboard tine assembly 118 being cantilevered from the shaft 108.

Figure 10:
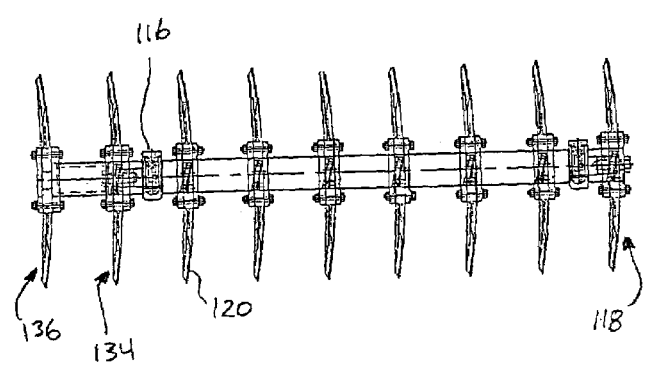
FIG. 10 is a detail view of an alternate embodiment of an outboard tine device according to the present invention, namely a dual outboard tine device having a cantilevered dual tine assembly on the left-hand side and a cantilevered single tine assembly on the right-hand side.
Figure 11:
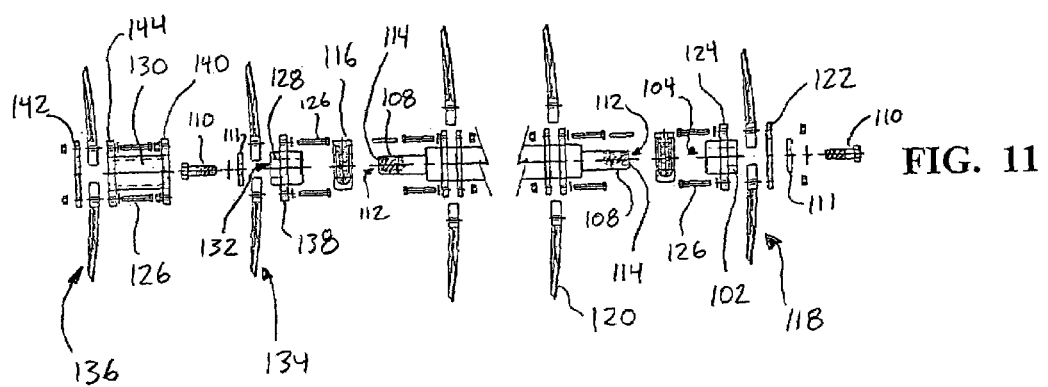
FIG. 11 is a detail exploded view of both the cantilevered dual tine assembly and the cantilevered single tine assembly shown in FIG. 10 above.

Referring now particularly to FIGS. 10 and 11, a dual outboard tine device is illustrated, although a single outboard tine device is provided on the right-hand side of the gang for ease of comparison. The dual outboard tine device comprises inner and outer hubs 128, 130, the inner hub 128 having an aperture 132 extending therethrough, the shaft 108 within the aperture 104, communication of the shaft 108 rotation to the hub 102 by the same means described above. The inner hub 128 is secured to an outboard end 114 of the shaft 108 in the same fashion as was the case with the single outboard tine device, by means of a bolt 110 threadably engaged in a hole 112 in the shaft 108, a disc 111 situated between the inner hub 128 and head of the bolt 110. The bearing assembly 116 communicates with the shaft 108 immediately inboard of the inner hub 128. In the embodiment of this aspect of the invention, there are two outboard tine assemblies, an inner assembly 134 and an outer assembly 136, each comprising a plurality of tines 120. The inner hub 128 is provided with a first flange 138 and the outer hub with a second flange 140, the two flanges 138, 140 mechanically fastened together with the tines 120 of the inner outboard tine assembly 134 therebetween, by means of a plurality of bolts 126. An outer flange 142, roughly analogous to the flange of the single outboard tine device, is mechanically fastened to an inner flange 144 on the outer hub 130, the tines 120 of the outer outboard tine assembly 136 therebetween. When fully assembled and secured, the elements shown in FIG. 11 would have the appearance illustrated in FIG. 10. In the single outboard tine arrangement, there is only one tine assembly 118 cantilevered outboard of the bearing assembly 116, while in the dual outboard tine arrangement there are two tine assemblies 134, 136 cantilevered outboard of the bearing assembly 116.

The utility of the present invention becomes clear in the following situation. If an operator (not shown) is using the soil-aerating device 100 to aerate a patch of soil, the problem of dog-tracking is addressed by the outboard cantilever feature of the design. Also, if one of the tines 120 becomes damaged by striking a rock or other submerged danger, or if a flange 122 cracks due to the stresses placed on the tines 120, the operator can disassemble the device simply by loosening the various bolts 126, 110, replace the damaged tine 120 or flange 122, and reassemble the device. As can therefore be seen, the present invention provides a gang arrangement on a soil-aerating device that addresses the problem of aeration row gaps, but it also provides an easily disassembled tine assembly structure to enable quick, simple, and inexpensive repairs or replacements when a tine becomes worn or damaged, without requiring the costly replacement of entire integrated assemblies.

While particular embodiments of the present invention have been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiments. For example, while there is currently a flange on the hub, one possible modification would be to eliminate the flange altogether by providing a hub of wider diameter and having the bolts fasten directly to the hub. The invention is therefore to be considered limited solely by the scope of the appended claims.

Embodiments of the invention in which an exclusive property or privilege is claimed are defined as follows:

1. An outboard tine device for soil-aerating equipment comprising:
   a hub having an aperture extending therethrough;
   a rotatable shaft member within the aperture;
   means to communicate rotational motion of the shaft member to the hub;
   means for removably securing the hub to the shaft member;
   a mounting assembly in communication with the shaft member for mounting the shaft member on the soil-aerating equipment;
   an outboard tine assembly comprising a plurality of outwardly protruding tine members, the outboard tine assembly adapted to rotate with the shaft member, such that at least a portion of each tine member sequentially penetrates soil when the outboard tine assembly is moved over the soil; and
   a securing member adjacent an outboard side of the outboard tine assembly removably securing the outboard tine assembly to the hub, wherein the securing member and hub are respectively positioned on opposing sides of and adjacent to the outboard tine assembly, whereby rotational motion of the hub is communicated to the outboard tine assembly and the securing member;
   wherein the outboard tine assembly, hub and securing member are positioned outboard of the mounting assembly resulting in the outboard tine assembly being cantilevered from the shaft member.

2. The outboard tine device of claim 1 wherein the means to communicate rotational motion of the shaft member to the hub comprises the shaft member having a polygonal cross section and the aperture of the hub being keyed to the shaft member.

3. The outboard tine device of claim 2 wherein the shaft member has a hexagonal cross section.

4. The outboard tine device of claim 1 wherein the means to communicate rotational motion of the shaft member to the hub comprises the shaft member communicating with the hub by means of at least one spline.

5. The outboard tine device of claim 1 wherein the means for removably securing the hub to the shaft member comprises at least one fastening member.

6. The outboard tine device of claim 5 wherein the at least one fastening member comprises a bolt member and a hole in an outboard end of the shaft member threaded so as to accept the bolt member.

7. The outboard tine device of claim 1 wherein the mounting assembly comprises a bearing assembly on the shaft member.

8. The outboard tine device of claim 1 wherein the securing member, the outboard tine assembly and the hub are removably mechanically fastened.

9. The outboard tine device of claim 1 wherein the securing member comprises a flange removably mechanically fastened to the outboard tine assembly and the hub by at least one fastening member.

10. The outboard tine device of claim 9 wherein the hub comprises a second flange, whereby the flange is removably mechanically fastened to the outboard tine assembly and the second flange by at least one fastening member.

11. The outboard tine device of claim 10 wherein the at least one fastening member comprises a plurality of bolt members passing through the flange, the outboard tine assembly and the second flange, thereby removably securing the outboard tine assembly to the flange and the second flange.

12. A dual outboard tine device for soil-aerating equipment comprising:
   inner and outer hubs, the inner hub having an aperture extending therethrough;
   a rotatable shaft member within the aperture;
   means to communicate rotational motion of the shaft member to the inner hub;
   means for removably securing the inner hub to the shaft member;
   a mounting assembly in communication with the shaft member for mounting the shaft member on the soil-aerating equipment;
   inner and outer outboard tine assemblies comprising a plurality of outwardly protruding tine members, the outboard tine assemblies adapted to rotate with the shaft member, such that at least a portion of each tine member sequentially penetrates soil when the outboard tine assemblies are moved over the soil, wherein the inner and outer hubs are respectively positioned on opposing sides of and adjacent to the inner outboard tine assembly;
   means for communicating rotational motion of the inner hub to the inner outboard tine assembly and the outer hub; and
   a securing member adjacent an outboard side of the outer outboard tine assembly removably securing the outer outboard tine assembly to the outer hub, wherein the securing member and outer hub are respectively positioned on opposing sides of and adjacent to the outer outboard tine assembly, whereby rotational motion of the outer hub is communicated to the outer outboard tine assembly and the securing member;
   wherein the inner and outer hubs, the inner and outer outboard tine assemblies, and the securing member are positioned outboard of the mounting assembly resulting in the outboard tine assemblies being cantilevered from the shaft member.

13. The dual outboard tine device of claim 12 wherein the means to communicate rotational motion of the shaft member to the inner hub comprises the shaft member having a polygonal cross section and the aperture of the inner hub being keyed to the shaft member.

14. The dual outboard tine device of claim 13 wherein the shaft member has a hexagonal cross section.

15. The dual outboard tine device of claim 12 wherein the means to communicate rotational motion of the shaft member to the inner hub comprises the shaft member communicating with the inner hub by means of at least one spline.

16. The dual outboard tine device of claim 12 wherein the means for removably securing the inner hub to the shaft member comprises at least one fastening member.

17. The dual outboard tine device of claim 16 wherein the at least one fastening member comprises a bolt member and a hole in an outboard end of the shaft member threaded so as to accept the bolt member.

18. The dual outboard tine device of claim 12 wherein the mounting assembly comprises a bearing assembly on the shaft member.

19. The dual outboard tine device of claim 12 wherein the means for communicating rotational motion of the inner hub to the inner outboard tine assembly and the outer hub comprises removable mechanical fastening of the inner hub to the inner outboard tine assembly and the outer hub.

20. The dual outboard tine device of claim 19 wherein the inner hub and outer hub comprise first and second flanges respectively, the first flange, the inner outboard tine assembly and the second flange being removably mechanically fastened by at least one fastening member.

21. The dual outboard tine device of claim 20 wherein the at least one fastening member comprises a plurality of bolt members passing through the first flange, the inner outboard tine assembly and the second flange, thereby removably securing the inner outboard tine assembly to the first and second flanges.

22. The dual outboard tine device of claim 12 wherein the securing member, the outer outboard tine assembly and the outer hub are removably mechanically fastened.

23. The dual outboard tine device of claim 12 wherein the securing member and the outer hub comprise outer and inner flanges respectively, the inner flange, the outer outboard tine assembly and the outer flange being removably mechanically fastened by at least one fastening member.

24. The dual outboard tine device of claim 23 wherein the at least one fastening member comprises a plurality of bolt members passing through the inner flange, the outer outboard tine assembly and the outer flange, thereby removably securing the outer outboard tine assembly to the inner and outer flanges.

25. Soil-aerating equipment comprising:
   a frame movable in an intended direction of travel; and
   an outboard tine device comprising:
      a hub having an aperture extending therethrough;
      a rotatable shaft member within the aperture;
      means to communicate rotational motion of the shaft member to the hub;
      means for removably securing the hub to the shaft member;
      a mounting assembly in communication with the shaft member mounting the shaft member on the frame;
      an outboard tine assembly comprising a plurality of outwardly protruding tine members, the outboard tine assembly adapted to rotate with the shaft member, such that at least a portion of each tine member sequentially penetrates soil when the outboard tine assembly is moved over the soil; and
      a securing member adjacent an outboard side of the outboard tine assembly removably securing the outboard tine assembly to the hub, wherein the securing member and hub are respectively positioned on opposing sides of and adjacent to the outboard tine assembly, whereby rotational motion of the hub is communicated to the outboard tine assembly and the securing member;
      wherein the outboard tine assembly, hub and securing member are positioned outboard of the mounting assembly resulting in the outboard tine assembly being cantilevered from the shaft member.

26. The soil-aerating equipment of claim 25 wherein the means to communicate rotational motion of the shaft member to the hub comprises the shaft member having a polygonal cross section and the aperture of the hub being keyed to the shaft member.

27. The soil-aerating equipment of claim 26 wherein the shaft member has a hexagonal cross section.

28. The soil-aerating equipment of claim 25 wherein the means to communicate rotational motion of the shaft member to the hub comprises the shaft member communicating with the hub by means of at least one spline.

29. The soil-aerating equipment of claim 25 wherein the means for removably securing the hub to the shaft member comprises at least one fastening member.

30. The soil-aerating equipment of claim 29 wherein the at least one fastening member comprises a bolt member and a hole in an outboard end of the shaft member threaded so as to accept the bolt member.

31. The soil-aerating equipment of claim 25 wherein the mounting assembly comprises a bearing assembly on the shaft member.

32. The soil-aerating equipment of claim 25 wherein the securing member, the outboard tine assembly and the hub are removably mechanically fastened.

33. The soil-aerating equipment of claim 25 wherein the securing member comprises a flange removably mechanically fastened to the outboard tine assembly and the hub by at least one fastening member.

34. The soil-aerating equipment of claim 33 wherein the hub comprises a second flange, whereby the flange is removably mechanically fastened to the outboard tine assembly and the second flange by at least one fastening member.

35. The soil-aerating equipment of claim 34 wherein the at least one fastening member comprises a plurality of bolt members passing through the flange, the outboard tine assembly and the second flange, thereby removably securing the outboard tine assembly to the flange and the second flange.

36. Soil-aerating equipment comprising:
   a frame movable in an intended direction of travel; and
   a dual outboard tine device comprising:
      inner and outer hubs, the inner hub having an aperture extending therethrough;
      a rotatable shaft member within the aperture;
      means to communicate rotational motion of the shaft member to the inner hub;
      means for removably securing the inner hub to the shaft member;
      a mounting assembly in communication with the shaft member mounting the shaft member on the frame;
      inner and outer outboard tine assemblies comprising a plurality of outwardly protruding tine members, the outboard tine assemblies adapted to rotate with the shaft member, such that at least a portion of each tine member sequentially penetrates soil when the outboard tine assemblies are moved over the soil, wherein the inner and outer hubs are respectively positioned on opposing sides of and adjacent to the inner outboard tine assembly;
      means for communicating rotational motion of the inner hub to the inner outboard tine assembly and the outer hub; and
      a securing member adjacent an outboard side of the outer outboard tine assembly removably securing the outer outboard tine assembly to the outer hub, wherein the securing member and outer hub are respectively positioned on opposing sides of and adjacent to the outer outboard tine assembly, whereby rotational motion of the outer hub is communicated to the outer outboard tine assembly and the securing member;
      wherein the inner and outer hubs, the inner and outer outboard tine assemblies, and the securing member are positioned outboard of the mounting assembly resulting in the outboard tine assemblies being cantilevered from the shaft member.

37. The soil-aerating equipment of claim 36 wherein the means to communicate rotational motion of the shaft member to the inner hub comprises the shaft member having a polygonal cross section and the aperture of the inner hub being keyed to the shaft member.

38. The soil-aerating equipment of claim 37 wherein the shaft member has a hexagonal cross section.

39. The soil-aerating equipment of claim 36 wherein the means to communicate rotational motion of the shaft member to the inner hub comprises the shaft member communicating with the inner hub by means of at least one spline.

40. The soil-aerating equipment of claim 36 wherein the means for removably securing the inner hub to the shaft member comprises at least one fastening member.

41. The soil-aerating equipment of claim 40 wherein the at least one fastening member comprises a bolt member and a hole in an outboard end of the shaft member threaded so as to accept the bolt member.

42. The soil-aerating equipment of claim 36 wherein the mounting assembly comprises a bearing assembly on the shaft member.

43. The soil-aerating equipment of claim 36 wherein the means for communicating rotational motion of the inner hub to the inner outboard tine assembly and the outer hub comprises removable mechanical fastening of the inner hub to the inner outboard tine assembly and the outer hub.

44. The soil-aerating equipment of claim 43 wherein the inner hub and outer hub comprise first and second flanges respectively, the first flange, the inner outboard tine assembly and the second flange being removably mechanically fastened by at least one fastening member.

45. The soil-aerating equipment of claim 44 wherein the at least one fastening member comprises a plurality of bolt members passing through the first flange, the inner outboard tine assembly and the second flange, thereby removably securing the inner outboard tine assembly to the first and second flanges.

46. The soil-aerating equipment of claim 36 wherein the securing member, the outer outboard tine assembly and the outer hub are removably mechanically fastened.

47. The soil-aerating equipment of claim 36 wherein the securing member and the outer hub comprise outer and inner flanges respectively, the inner flange, the outer outboard tine assembly and the outer flange being removably mechanically fastened by at least one fastening member.

48. The soil-aerating equipment of claim 47 wherein the at least one fastening member comprises a plurality of bolt members passing through the inner flange, the outer outboard tine assembly and the outer flange, thereby removably securing the outer outboard tine assembly to the inner and outer flanges.

49. An outboard tine device for soil-aerating equipment comprising:
   at least one paired outboard tine assembly and corresponding hub, the at least one corresponding hub having an aperture extending therethrough, the at least one outboard tine assembly adjacent to and outboard of the corresponding hub;
   a rotatable shaft member within the aperture;
   means to communicate rotational motion of the shaft member to the at least one corresponding hub;

means for removably securing the at least one corresponding hub to the shaft member;

a mounting assembly in communication with the shaft member for mounting the shaft member on the soil-aerating equipment;

the at least one outboard tine assembly comprising at least one outwardly protruding tine member, the at least one outboard tine assembly adapted to rotate with the shaft member, such that at least a portion of the at least one tine member penetrates soil when the at least one outboard tine assembly is moved over the soil; and a securing member adjacent an outboard side of the at least one paired outboard tine assembly and corresponding hub removably securing together an outermost paired outboard tine assembly and corresponding hub, whereby rotational motion of the corresponding hub is communicated to the outboard tine assembly and the securing member;

wherein the securing member and the at least one paired outboard tine assembly and corresponding hub are positioned outboard of the mounting assembly resulting in the at least one outboard tine assembly being cantilevered from the shaft member.

50. An outboard tine device for soil-aerating equipment comprising:

a hub having an aperture extending therethrough, the hub comprising a first flange;

a rotatable shaft within the aperture;

a spline on the shaft and the aperture keyed to accept the spline, to communicate rotational motion of the shaft to the hub;

a fastening member removably securing the hub to the shaft;

a bearing assembly on the shaft for mounting the shaft on the soil-aerating equipment;

an outboard tine assembly comprising a plurality of outwardly protruding tine members, the outboard tine assembly adapted to rotate with the shaft, such that at least a portion of each tine member sequentially penetrates soil when the outboard tine assembly is moved over the soil; and a second flange adjacent an outboard side of the outboard tine assembly, the second flange removably mechanically fastened to the outboard tine assembly and the first flange, wherein the first and second flanges are respectively positioned on opposing sides of and adjacent to the outboard tine assembly, whereby rotational motion of the first flange is communicated to the outboard tine assembly and the second flange;

wherein the outboard tine assembly, first flange and second flange are positioned outboard of the bearing assembly resulting in the outboard tine assembly being cantilevered from the shaft.

51. A dual outboard tine device for soil-aerating equipment comprising:

inner and outer hubs, the inner hub having an aperture extending therethrough, the inner hub comprising a first flange, the outer hub comprising a corresponding second flange and an inner flange;

a rotatable shaft within the aperture;

a spline on the shaft and the aperture keyed to accept the spline, to communicate rotational motion of the shaft to the inner hub;

a fastening member removably securing the inner hub to the shaft;

a bearing assembly on the shaft for mounting the shaft on the soil-aerating equipment;

inner and outer outboard tine assemblies comprising a plurality of outwardly protruding tine members, the outboard tine assemblies adapted to rotate with the shaft, such that at least a portion of each tine member sequentially penetrates soil when the outboard tine assemblies are moved over the soil, wherein the inner and outer hubs are respectively positioned on opposing sides of and adjacent to the inner outboard tine assembly;

at least one fastening member securing the first flange to the inner outboard tine assembly and the second flange, thereby communicating rotational motion of the inner hub to the inner outboard tine assembly and the outer hub; and an outer flange adjacent an outboard side of the outer outboard tine assembly removably securing the outer outboard tine assembly to the inner flange, wherein the outer and inner flanges are respectively positioned on opposing sides of and adjacent to the outer outboard tine assembly, whereby rotational motion of the outer hub is communicated to the outer outboard tine assembly and the outer flange;

wherein the inner and outer hubs, the inner and outer outboard tine assemblies, and the outer flange are positioned outboard of the bearing assembly resulting in the outboard tine assemblies being cantilevered from the shaft.

* * * * *